United States Patent [19]

Joffe

[11] 4,400,067
[45] Aug. 23, 1983

[54] ONE-PIECE SPECTACLE WITH HINGE

[76] Inventor: Edward J. Joffe, 940 Park Ave., Linden, N.J. 07036

[21] Appl. No.: 328,603

[22] Filed: Dec. 8, 1981

[51] Int. Cl.³ .............................................. G02C 9/02
[52] U.S. Cl. ...................................... 351/59; 351/63; 351/85
[58] Field of Search ....................... 351/59, 57, 60, 63, 351/47, 85; 2/13, 454; 350/140, 250

[56] References Cited

U.S. PATENT DOCUMENTS 2,975,426 3/1961 Rabb ...................................... 351/63
3,438,698 4/1969 Triggs ................................. 350/250

Primary Examiner—Bruce Y. Arnold
Assistant Examiner—Paul M. Dzierzynski
Attorney, Agent, or Firm—Colton & Stone, Inc.

[57] ABSTRACT

A spectacle frame of one-piece molded plastic construction for film-like lens, e.g., lens used in viewing 3-D movies, includes a pair of temple pieces connected by a crossbar and a lens frame and bridge piece joined to the crossbar by a hinge web. A latch integral with the crossbar engages the bridge piece when the spectacle is in use.

4 Claims, 6 Drawing Figures

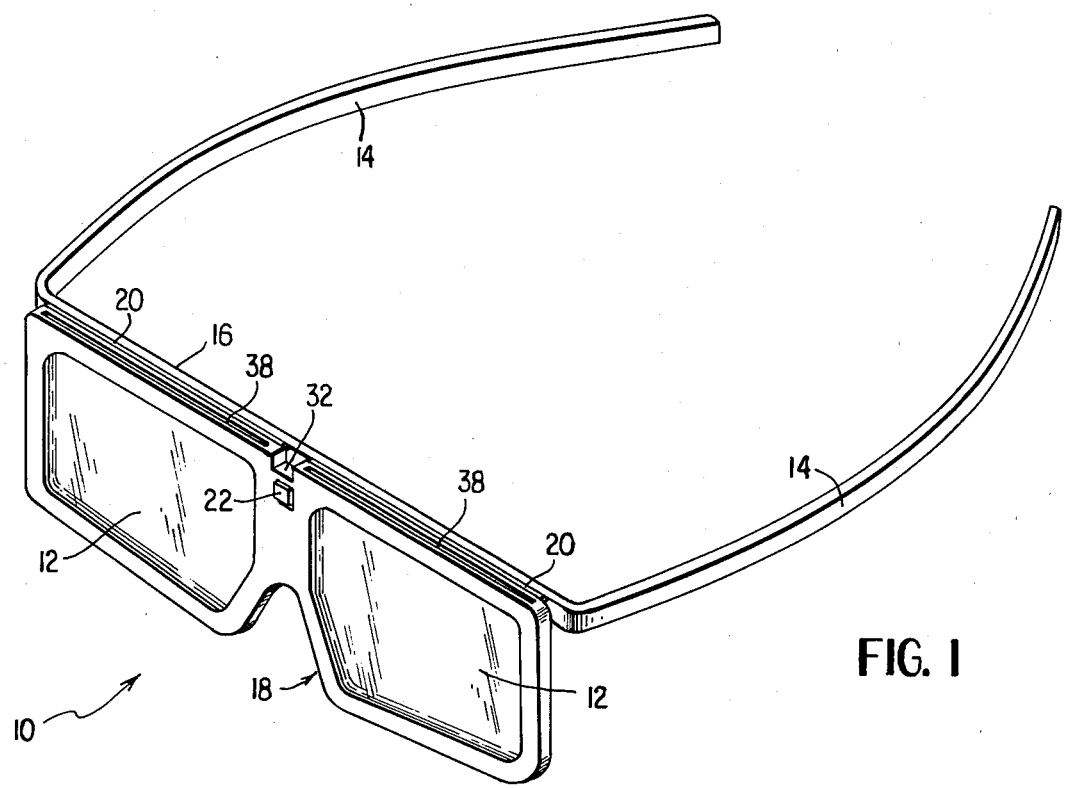
FIG. 1
FIG. 2
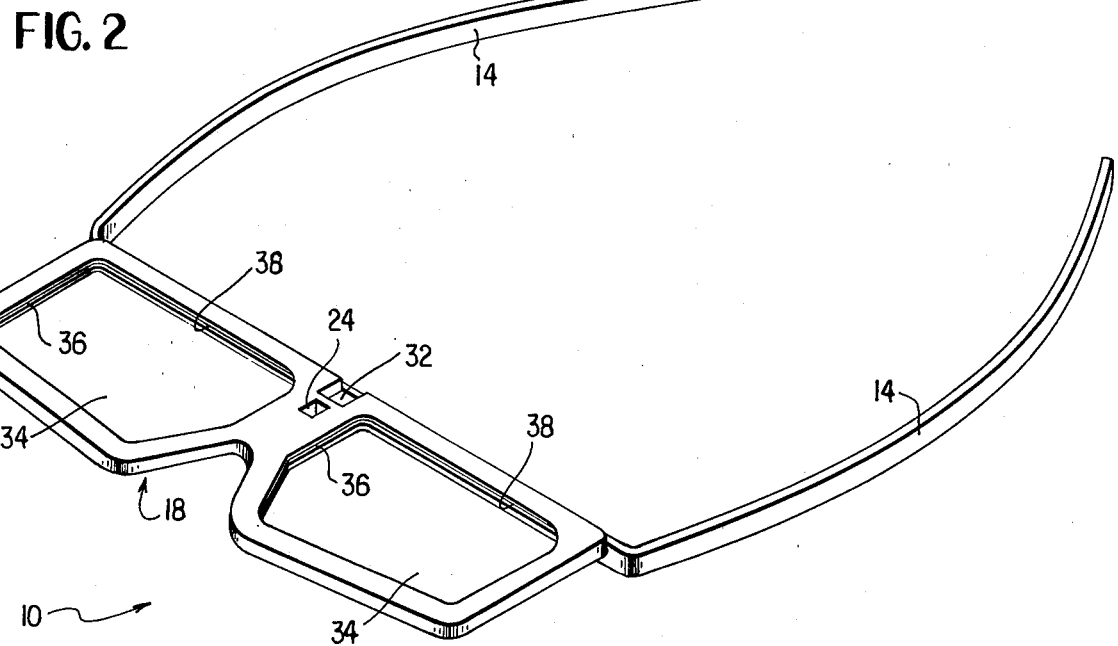

ONE-PIECE SPECTACLE WITH HINGE

The present invention relates to spectacle frames and, more particularly, to molded spectacle frames adapted to be fitted with film-like lens.

BACKGROUND OF THE INVENTION

The creation of a three-dimensioned effect in a 3-D movie is achieved by furnishing different images to the viewer's left and right eyes. These movies are viewed through lens which filter the images using lens which may be of complementary colors, e.g., red and green, or may be polarized.

It is the primary object of the present invention to provide a spectacle frame for carrying such lenses.

A further object of the invention is the provision of such a spectacle frame which may be produced inexpensively and in quantity.

Another object of the invention is the provision of such a spectacle frame which may be collapsed to a generally planar configuration for compact packaging while providing a stable frame when in use.

The above and other objects of the invention which will become apparent hereinafter are achieved by the provision of a spectacle frame of single piece molded plastic construction consisting of a pair of temple pieces connected by a crossbar, a lens frame and bridge piece connected to the crossbar by a web hinge, and cooperating latch means on the crossbar and bridge piece. The top of each lens opening is slotted and the sides thereof grooved for reception of a film-like lens.

For a more complete understanding of the invention and the objects and advantages thereof, reference should be had to the following detailed description and the accompanying drawings wherein a preferred embodiment of the invention is shown and described.

DESCRIPTION OF THE DRAWINGS

In the drawings:

FIG. 1 is a perspective view of the spectacle frame of the present invention;

FIG. 2 is a perspective view of the spectacle frame as molded;

DETAILED DESCRIPTION OF THE PREFERRED EMBODIMENT

Figure 3:
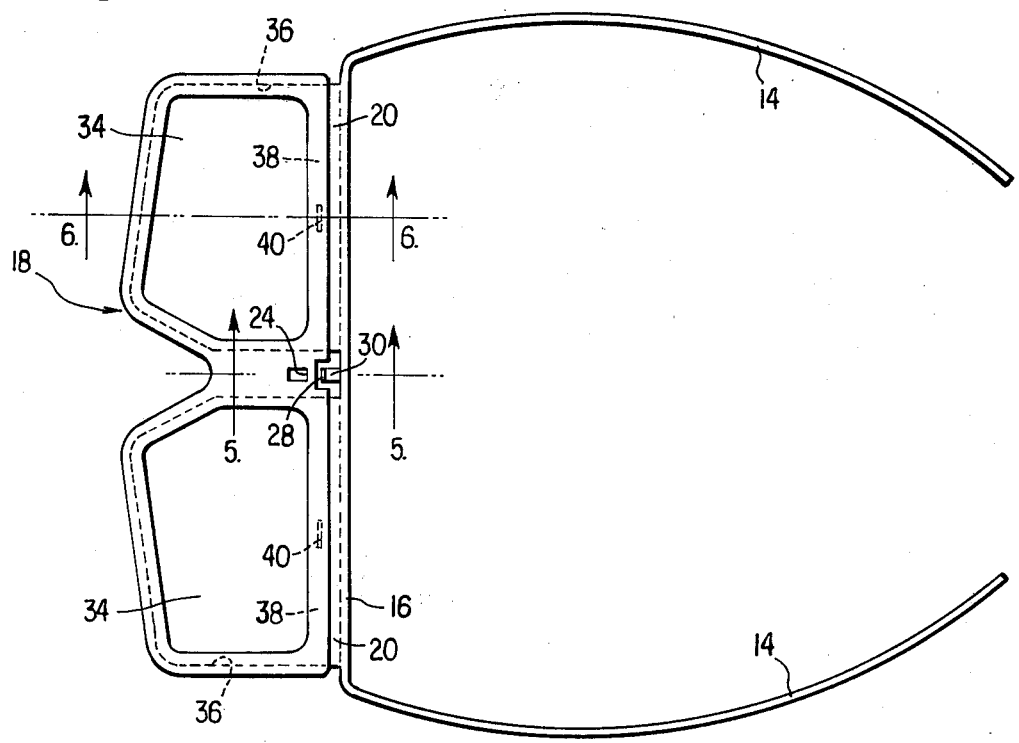
FIGS. 3 and 4 are plane and side elevational views, respectively, of the spectacle frame.

Referring first to FIG. 1, the spectacle frame 10 of the present invention is designed for use with film-like lens 12 which may be pieces of Polarized film of the type used to view 3-D movies. It will be understood, however, that other types of lens may be fitted in the frame.

The frame 10 is of single piece construction, being molded of a plastic material such as polypropylene, having a pair of temple pieces 14 extending from opposite ends of a crossbar 16. The lens frame 18 is connected to the crossbar by a web 20, which functions as a hinge.

Figure 4:
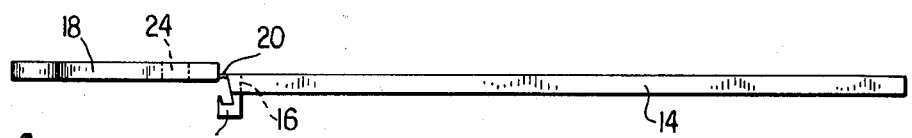
Figure 5:
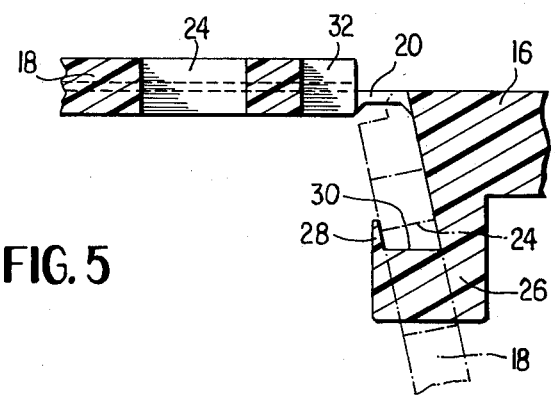
FIGS. 5 and 6 are fragmentary sectional views taken on the lines 5—5 and 6—6, respectively, of FIG. 3.
Figure 6:
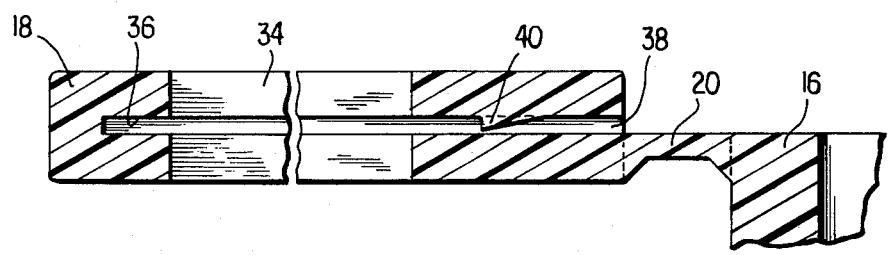

As can be seen from FIGS. 2, 3 and 4, the spectacle frame, when molded, is substantially planar, a configuration which facilitates packaging, shipment and storage. A latch 22 projection from the crossbar engages the lens frame 18 through an opening 24 when the spectacles are in use. The latch 22 is illustrated most clearly in FIG. 5 and includes a generally L-shaped portion projecting downwardly and forwardly from the crossbar 16, the forward end terminating in an upwardly projecting, tapered tip 28. As is shown in phantom outline, the tip 28 overlies the forward face of the lens frame 18 to latch the frame in position when in use. Clearance for the die member which forms the recess 30 is provided by the notch 32 in the spectacle frame 18.

As has been discussed above, the frame 10 is fitted with flat, film-like lens. The peripheral side and lower walls of each lens opening 34 are grooved, as indicated by the numeral 36 and a slot 38 is provided in the upper peripheral wall for reception of the lens 12. A wedge-shaped lug 40 projects into each slot 35 to retain the lens in position. The slots 36 and grooves 38 are, preferably, formed by means of sliding dies which may be of the type disclosed in my U.S. Pat. No. 3,166,795.

It will be understood that while the preferred embodiment of the invention has been illustrated and described in detail, the invention is not limited thereto. Reference should accordingly be had to the following claims for a determination of the true scope of the invention.

What is claimed is:

1. A one-piece spectacle frame adapted to be fitted with insertable lenses comprising:
   a pair of temple pieces;
   a crossbar connecting the forward ends of said temple pieces;
   a lens rim and bridge piece;
   a web hinge connecting said crossbar and said lens rim and bridge piece; and
   inter-engageable latch means on said crossbar and said lens rim and bridge piece; whereby said lens rim and bridge piece and said pair of temple pieces may be oriented in a first, substantially planar, configuration and, upon hinging of said web hinge, may be oriented in a second, in-use configuration; and wherein said latch means serves to retain said frame in said second configuration.

2. The one-piece spectacle frame of claim 1 wherein each lens rim of said lens rim and bridge piece has grooved side and bottom peripheral walls and a slotted top wall, whereby the lens may be inserted to said lens rim by insertion through said slotted top wall.

3. The one-piece spectacle frame of claim 2 wherein lens holding means comprising a wedge-shaped lug projecting into the slot of the top wall of each said lens rim.

4. The one-piece spectacle frame of claim 1, 2 or 3 wherein said frame is molded of polypropylene.

* * * * *